United States Patent
Hur (12) 
(10) Patent No.: US 10,483,518 B2
(45) Date of Patent: Nov. 19, 2019

(54) SECONDARY BATTERY INCLUDING PULL TAB PROTRUDING FROM BOTTOM

(71) Applicant: SAMSUNG SDI CO., LTD., Yongin-si, Gyeonggi-do (KR)

(72) Inventor: Sangdo Hur, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 141 days.

(21) Appl. No.: 15/638,759

(22) Filed: Jun. 30, 2017

(65) Prior Publication Data

US 2018/0013121 A1 Jan. 11, 2018

(30) Foreign Application Priority Data

Jul. 11, 2016 (KR) .................. 10-2016-0087500

(51) Int. Cl.
| | |
|---|---|
| *H01M 2/24* | (2006.01) |
| *H01M 10/04* | (2006.01) |
| *H01M 2/04* | (2006.01) |

(52) U.S. Cl.
CPC .......... *H01M 2/24* (2013.01); *H01M 10/0413* (2013.01); *H01M 2/04* (2013.01)

(58) Field of Classification Search
CPC ............................ H01M 2/24; H01M 10/0413

USPC ........................................................ 429/160
See application file for complete search history.

(56) References Cited

U.S. PATENT DOCUMENTS

| | | | | |
|---|---|---|---|---|
| 2004/0029000 | A1* | 2/2004 | Morita ............... | H01M 2/1061 429/162 |
| 2009/0081539 | A1* | 3/2009 | Koh .................... | H01M 2/1061 429/178 |
| 2011/0223447 | A1* | 9/2011 | Ignor .................. | H01M 2/0207 429/7 |

FOREIGN PATENT DOCUMENTS

| | | | |
|---|---|---|---|
| JP | 2008218080 A | | 9/2008 |
| JP | 2010116135 A | | 5/2010 |
| JP | 2015211022 A | * | 11/2015 |
| KR | 20080020334 A | | 3/2008 |
| KR | 20080065822 A | | 7/2008 |

\* cited by examiner

*Primary Examiner* — Sean P Cullen
(74) *Attorney, Agent, or Firm* — Lee & Morse, P.C.

(57) ABSTRACT

A secondary battery includes a battery cell, a protection circuit module electrically connected to the battery cell, a top case covering the protection circuit module, and a bottom case covering a bottom surface of the battery cell. The bottom case includes a pull tab protruding to an outside of the bottom case.

7 Claims, 9 Drawing Sheets

SECONDARY BATTERY INCLUDING PULL TAB PROTRUDING FROM BOTTOM

CROSS-REFERENCE TO RELATED APPLICATION

Korean Patent Application No. 10-2016-0087500, filed on Jul. 11, 2016, in the Korean Intellectual Property Office, and entitled: "Secondary Battery," is incorporated by reference herein in its entirety.

BACKGROUND

1. Field

Embodiments relate to a secondary battery.

2. Description of the Related Art

Unlike primary batteries, which cannot be recharged, secondary batteries are generally chargeable and dischargeable. Low-capacity secondary batteries in which one battery cell is packaged in the form of a battery pack are typically used in small portable electronic devices, such as cellular phones or the like, while high-power secondary batteries in which several tens of battery cells are connected in the form of a battery pack and are widely used as power sources for driving motors of devices consuming a considerable amount of electricity, such as electric bicycles, electric scooters, electric vehicles, or the like.

Secondary batteries are manufactured in various types, including a prismatic type secondary battery, a cylinder type secondary battery and a pouch type secondary battery. The secondary battery is generally constructed by accommodating an electrode assembly and an electrolyte solution in a case and installing a cap plate in the case. In addition, electrode tabs and terminals of positive and negative electrodes are connected to the electrode assembly and are exposed or protrude to the outside through the cap plate.

SUMMARY

Embodiments are directed to a secondary battery including a battery cell, a protection circuit module electrically connected to the battery cell, a top case covering the protection circuit module, and a bottom case covering a bottom surface of the battery cell. The bottom case includes a pull tab protruding to an outside of the bottom case.

The bottom case may further include a pair of adhered parts extending a predetermined length from opposite long side regions in a vertical direction with respect to a bottom surface of the bottom case, the pair of adhered parts being asymmetrical with each other.

A zig groove may be located in one adhered part of the pair of adhered parts.

The zig groove located in the one adhered part may be a semicircular groove that extends from an end of the adhered part toward the bottom surface of the bottom case.

The bottom case may include a penetration groove located at a center of a bottom surface of the bottom case. The pull tab may protrude from an inside to the outside of the bottom case while passing through the penetration groove. One end of the pull tab inserted into the bottom case may be adhered to one region of an upper surface of the bottom portion of the bottom case.

The upper surface of the bottom portion of the bottom case may have a stepped part of a predetermined depth such that one region of the bottom case is lower than the another region, the penetration groove being between the one region and the other region of the bottom case.

The predetermined depth of stepped part may correspond to a thickness of the pull tab. One end of the pull tab is adhered to the region having the stepped part of the predetermined depth.

The pull tab may have flexibility in at least one region.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

Figure 1A:
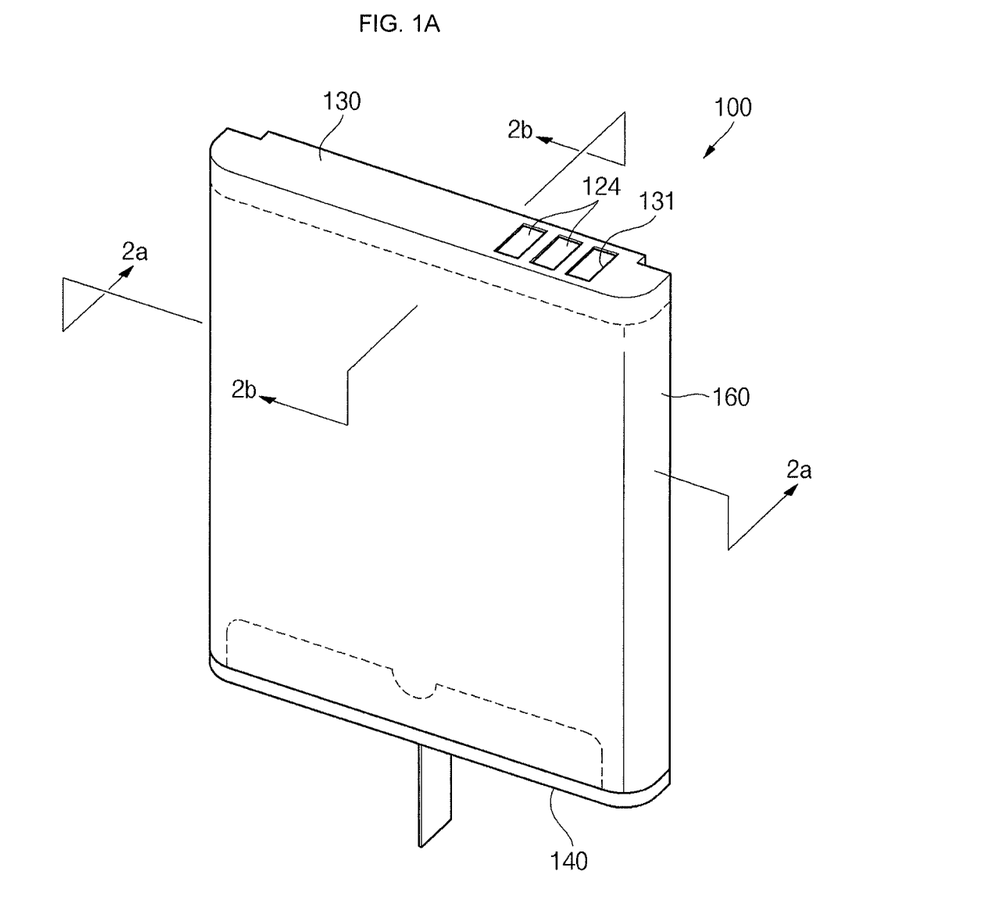
FIGS. 1A and 1B illustrate a perspective view and an exploded perspective view of a secondary battery according to an embodiment.
Figure 1B:
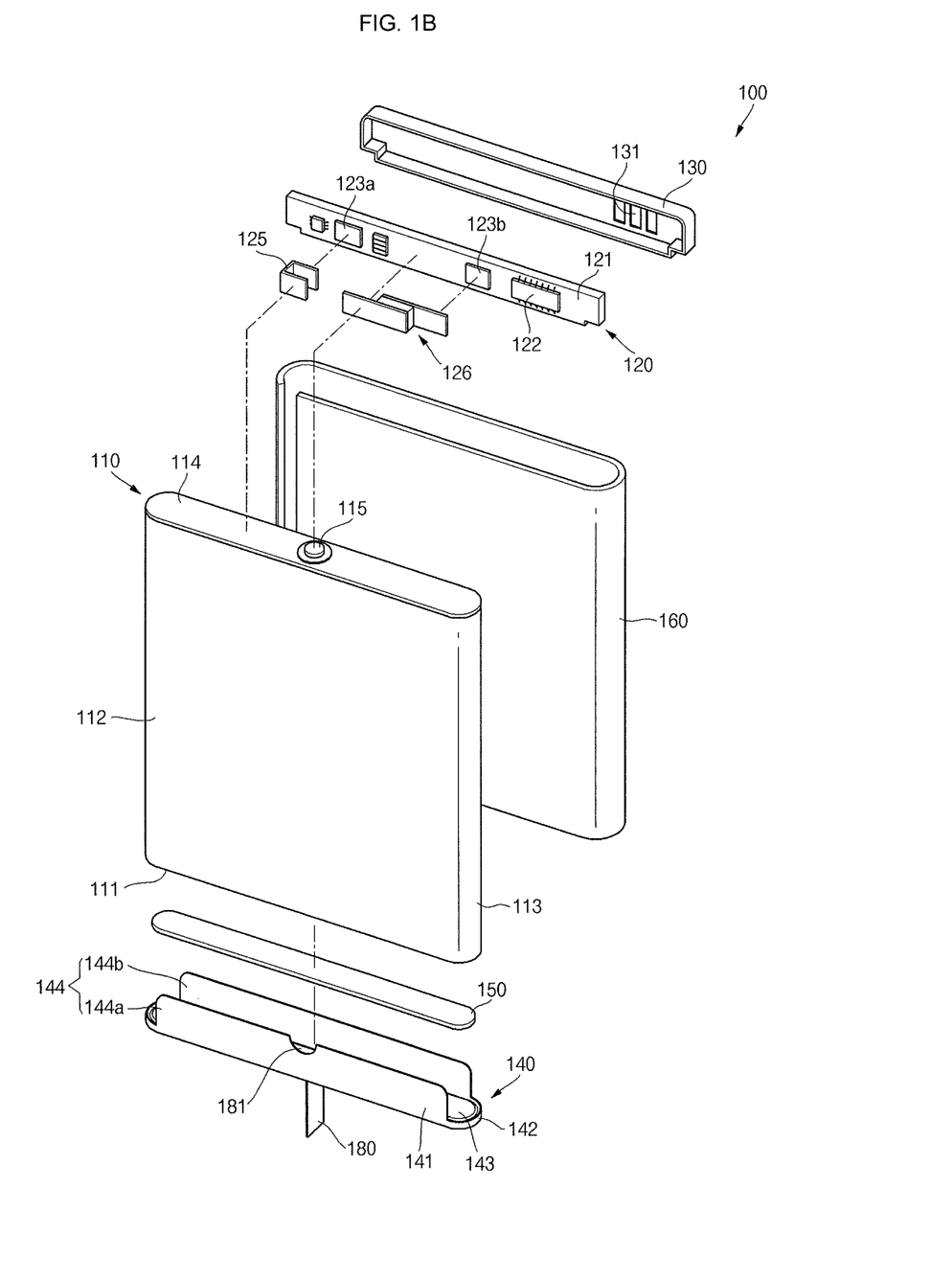

FIGS. 1A and 1B illustrate a perspective view and an exploded perspective view of a secondary battery 100 according to an embodiment.

As illustrated in FIGS. 1A and 1B, the secondary battery 100 according to an embodiment may include a battery cell 110, a protection circuit module 120, a top case 130, a bottom case 140 and a label 160.

Figure 5:
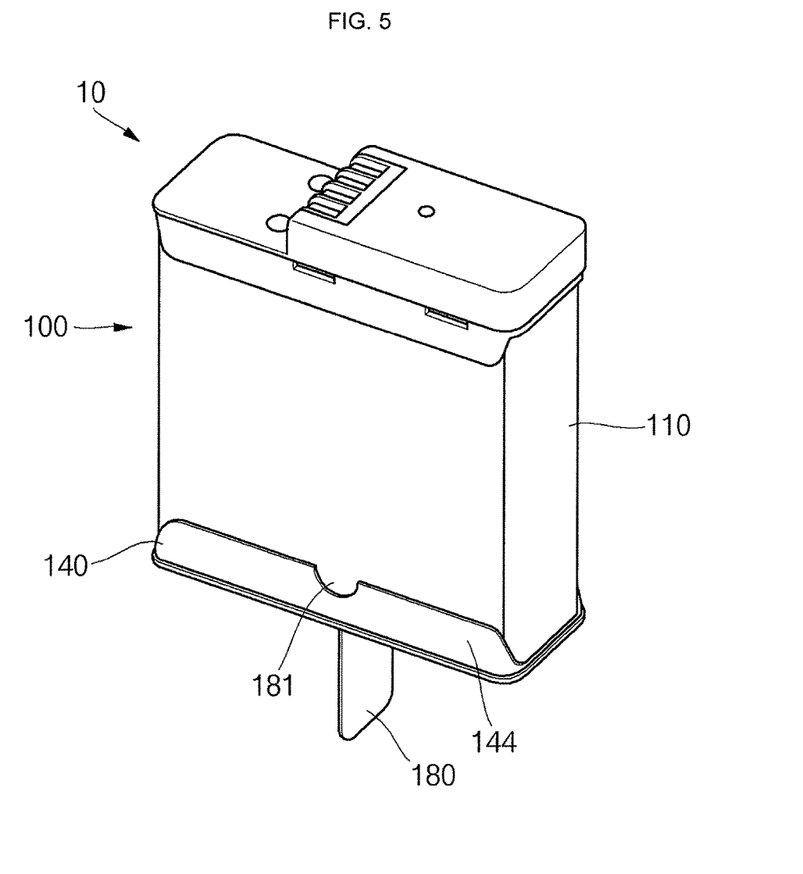
FIG. 5 illustrates a perspective view illustrating a battery pack and a bent direction of a pull tab according to an embodiment.

The battery cell 110 charges or discharges electric energy. In some implementations, as shown in FIG. 1B, the battery cell 110 may include a bottom surface 111, a pair of long side regions 112 upwardly extending from the bottom surface 111, a pair of short side regions 113 connecting the pair of long side regions 112 in a curved manner, a cap plate 114 covering an opening defined at the top of the long side regions 112 and the short side regions 113, and a terminal 115 formed in the cap plate 114. The bottom surface 111, the pair of long side regions 112 and the pair of short side regions 113 are collectively referred to as a can or a case. The can may be formed using one selected from aluminum, an aluminum alloy, steel, nickel plated steel or equivalents thereof. The cap plate 114 may be welded to the can by a laser beam. The cap plate 114, like the can, may be formed using one selected from aluminum, an aluminum alloy, steel, nickel plated steel or equivalents thereof. The terminal 115 may be electrically insulated from the cap plate 114. In some implementations, the battery cell 110 may have other suitable configurations. For example, as shown in FIG. 5, the short side regions 113 may be straight instead of curved.

An electrode assembly including a positive electrode plate, a separator and a negative electrode plate and an organic electrolyte solution may be accommodated in the battery cell 110. The battery cell 110 may be a general lithium ion battery or lithium polymer battery, as examples.

The protection circuit module 120 may prevent overcharge, over-discharge, or over-current of the battery cell 110. The protection circuit may include a printed circuit board 121, a plurality of electronic protective devices 122 mounted in the printed circuit board 121, cell terminals 123a and 123b formed on one surface of the printed circuit board 121, and a pack terminal 124 formed on the other surface of the printed circuit board 121. One cell terminal 123a may be electrically connected to the cap plate 114 of the battery cell 110 through a connection plate 125. The other cell terminal 123b may be electrically connected to the terminal 115 of the battery cell 110 through a heat-sensitive safety device 126. The heat-sensitive safety device 126 may be a positive temperature coefficient (PTC) device having an increasing resistance value according to an increase in the temperature.

The top case 130 may cover the protection circuit module 120, thereby protecting the protection circuit module 120 from external circumstances. The top case 130 may prevent external foreign materials from penetrating into the protection circuit module 120 and may prevent the protection circuit module 120 from being damaged during a drop test of the secondary battery 100. In order to allow the pack terminal 124 of the protection circuit module 120 to be exposed to the outside, the top case 130 may include at least one opening 131. The top case 130 may be formed using a pre-molded plastic resin to then be coupled to the protection circuit module 120 or may be manufactured by mounting the battery cell 110 and the protection circuit module 120 in a mold, followed by performing injection molding.

The bottom case 140 may cover the bottom surface 111 of the battery cell 110, thereby preventing the battery cell 110 from being damaged during a drop test of the secondary battery 100. The bottom case 140 may be formed using a pre-molded plastic resin to then be coupled to the bottom surface 111 of the battery cell 110.

Figure 4:
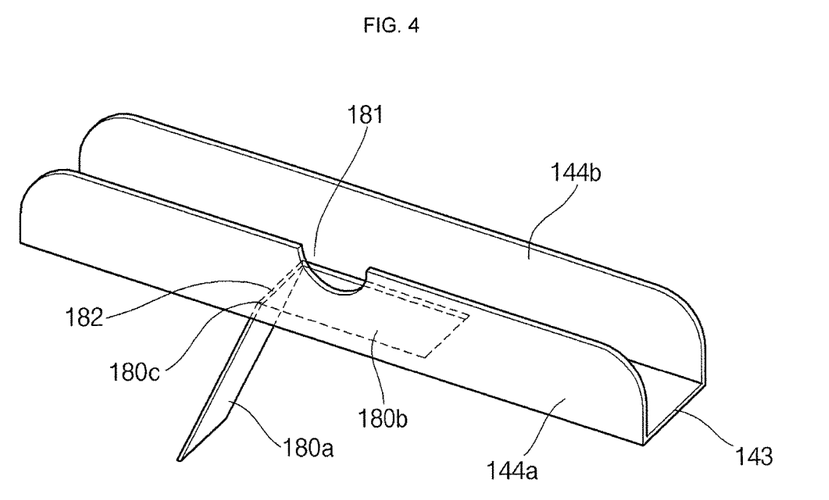
FIG. 4 illustrates a perspective view of a bottom case according to an embodiment.

When the battery cell 110 has the configuration shown in FIG. 1B, the bottom case 140 may include a pair of linear long sides 141 spaced apart from each other, and a pair of curved short sides 142 connecting opposite ends of the linear long sides 141. The linear long sides 141 of the bottom case 140 may correspond to the long side regions 112 of the battery cell 110, and the curved short sides 142 of the bottom case 140 may correspond to the short side regions 113 of the battery cell 110. The bottom surface 111 of the battery cell 110 may be covered by a predetermined region of the bottom case 140 including the pair of linear long sides 141 and the pair of curved short sides 142. The bottom case 140 may include a bottom portion 143 that covers the bottom surface 111 of the battery cell 110. When the battery cell 110 has other configurations, such as that shown for example in FIG. 5 or other suitable shapes, the bottom portion 143 of the bottom case 140 may conform to the shape of the bottom surface 111 of the battery cell 110. For example, the battery cell 110 may be hexahedral and the short sides 142 of the bottom case may be straight, as shown in FIGS. 4 and 5.

The bottom case 140 may include a pull tab 180 protruding to the outside of the bottom case 140, for example, in a downward direction. The pull tab 180 may serve as a handle when the battery pack is mounted/dismounted in/from an electronic device. The pull tab 180 may be bent at a position adhered to the bottom case so as to closely adhere to a lower portion of the bottom case 140 when a battery cover of the electronic device is closed.

The bottom case 140 may further include adhered parts 144 extending a predetermined length toward the long side regions 112 of the battery cell 110. The adhered parts 144 may be coupled and closely adhered to the long side regions 112 of the battery cell 110.

An adhesive agent 150 may be interposed between the bottom case 140 and the bottom surface 111 of the battery cell 110, thereby preventing the bottom case 140 and the battery cell 110 from being separated from each other.

The two adhered parts 144 extending from the two long side regions 112 of the bottom case 140 may be asymmetrical with each other. For example, as illustrated in FIG. 1B, one of the two adhered parts 144 may include a zig groove 181 formed therein.

The label 160 may cover the battery cell 110, the top case 130 and the bottom case 140. An upper region of the top case 130 and a lower region of the bottom case 140 may be exposed to the outside through the label 160. The label 160 may entirely cover the long side regions 112 and the short side regions 113 of the battery cell 110, thereby protecting the battery cell 110 from external circumstances and helping to prevent the battery cell 110 from being unnecessarily electrically shorted to an external device.

Figure 2A:
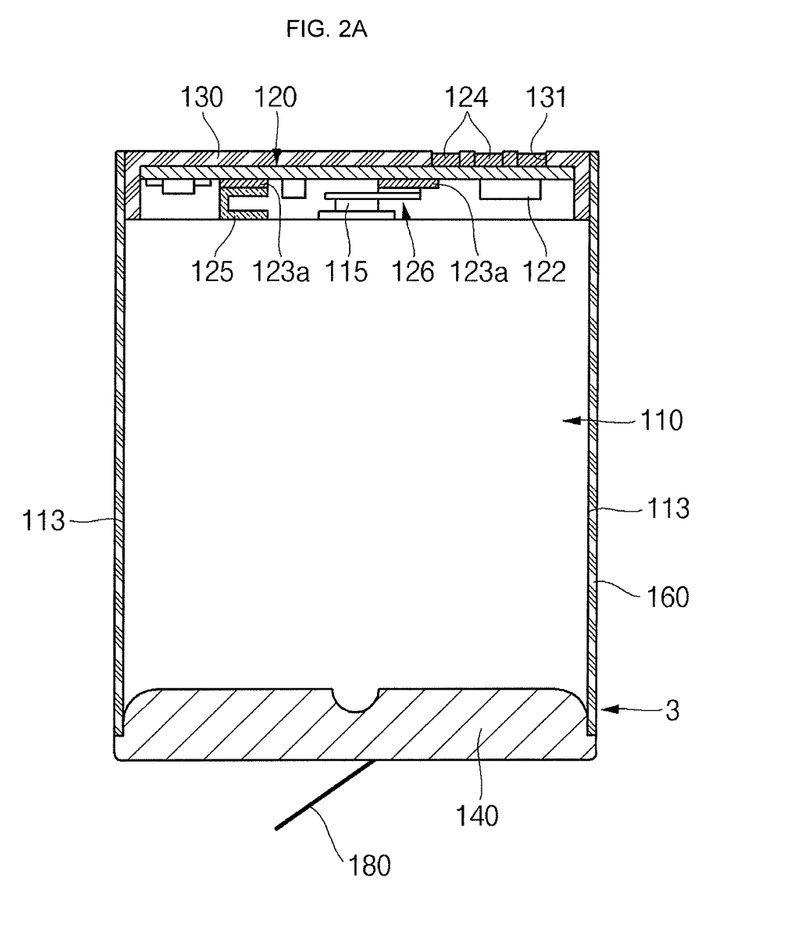
FIGS. 2A and 2B illustrate partially cross-sectional views along lines 2a-2a and 2b-2b of FIG. 1A.
Figure 2B:
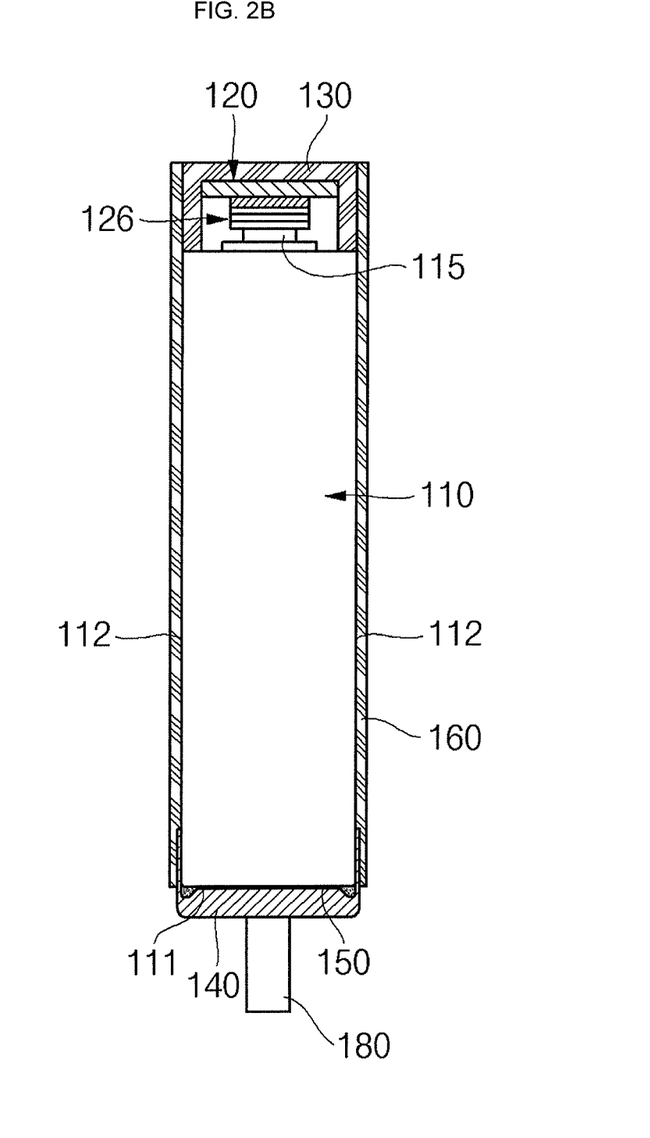

FIGS. 2A and 2B illustrate partially cross-sectional views along lines 2a-2a and 2b-2b of FIG. 1A.

As illustrated in FIGS. 2A and 2B, the protection circuit module 120 may be electrically connected to the battery cell 110 through the connection plate 125 and the heat-sensitive safety device 126 on the battery cell 110. The protection circuit module 120 may be covered by the top case 130. The pack terminal 124 formed in the protection circuit module 120 may be exposed to the outside through the opening 131 formed in the top case 130.

The bottom case 140 may be mechanically coupled to a lower portion of the battery cell 110, and the adhesive agent 150 may be interposed between the battery cell 110 and the bottom case 140. The bottom case 140 may include the pull tab 180 protruding to the outside of the bottom case 140, for example, in the downward direction. The pull tab 180 may facilitate mounting/dismounting of the battery pack in/from an electronic device. When the battery cover of an electronic device into which the battery pack is mounted is closed, the pull tab 180 may be bent at a connection part of the bottom case 140 so as to be bent together with the battery cover in a direction in which the battery cover is closed.

The two adhered parts 144 extending from the two long side regions 112 of the bottom case 140 may be asymmetrical with each other. As illustrated in FIG. 2A, one of the two adhered parts 144 may have a zig groove 181 formed therein.

The battery cell 110, the adhered parts 144 of the bottom case 140 and the top case 130 may be covered by the label 160, thereby preventing the top case 130 and the bottom case 140 from being separated from the battery cell 110. The upper region of the top case 130 and the lower region of the bottom case 140 may be exposed to the outside through the label 160.

Figure 3:
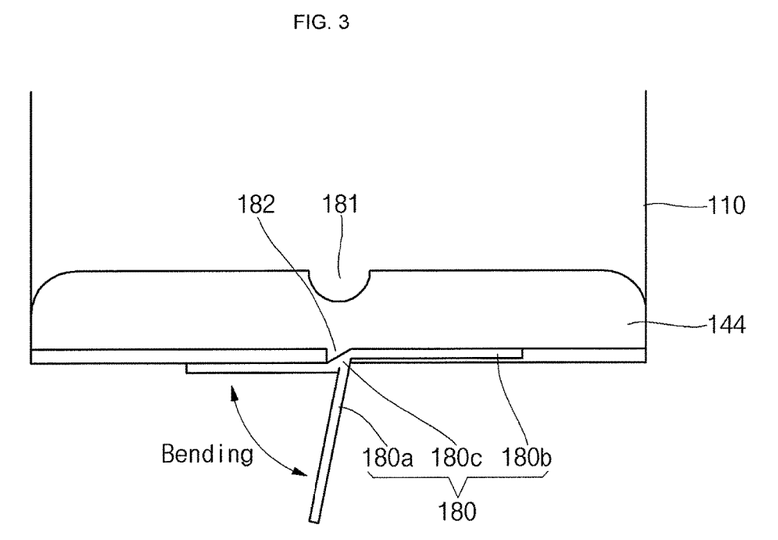
FIG. 3 illustrates an enlarged view of a region 3 of FIG. 2A.

FIG. 3 illustrates an enlarged view of a region 3 of FIG. 2A and FIG. 4 illustrates a perspective view of the bottom case according to an embodiment.

Referring to FIGS. 3 and 4, the pull tab 180 of the bottom case 140 may be configured to protrude from the inside to the outside of the bottom case 140 through a penetration groove 182 formed near the center of the bottom case 140. For example, the pull tab 180 may include a first region 180a protruding to the outside of the bottom case 140, a second region 180b adhered to the inside of the bottom case 140, and a third region 180c connecting the first region 180a and the second region 180b to each other, the third region 180c being bendable in a vicinity of the penetration groove 182. For example, as shown in FIG. 3, the third region 180c Referring to FIG. 3, the second region 180b of the pull tab 180 may be inserted into the bottom case 140 to then be adhered to a region of an upper portion of the bottom surface of the bottom case 140. The first region 180a of the pull tab 180 may be bent at the third region 180c due to the flexibility of the third region 180c. The first region 180a of the pull tab 180 may be adhered to a lower portion of the bottom surface of the bottom case 140 outside of the bottom case 140. For example, as shown in FIG. 3, the pull tab 180 may be bendable at the third region 180c such that the first region 180a may be selectively moved between a position where the first region 180a adheres to the outside bottom surface of the bottom case 140 and a position where the first region 180a juts out from the outside bottom surface to allow the first region 180a to be grasped.

Also, as shown in FIG. 3, the first region 180a and the second region 180b of the pull tab 180 may have substantially the same width and length. For example, in an unbent state, the pull tab 180 may be a linear structure.

For example, when the battery cover of an electronic device such as a camera is closed after the battery pack of the secondary battery 100 is inserted into the electronic device, the pull tab 180 may also be bent and moved such that the first region 180a contacts the bottom surface of the bottom case 140. When the battery cover of the electronic device is opened, the third region 180c may protrude in a direction opposite to the bottom case 140 due to resilience of the third region 180c. Accordingly, when the battery cover is opened, the first region 180a of the pull tab 180 also protrudes to the outside, such that a user can easily withdraw the battery pack by seizing the first region 180a of the pull tab 180. In the illustrated embodiment, the third region 180c of the pull tab 180 may be flexible When the first to third regions 180a to 180c are made of the same material, all regions of the pull tab 180 may have flexibility and first to third regions 180a to 180c may not be physically distinct from one another.

The penetration groove 182 of the bottom case 140 may have a size corresponding to a thickness of the pull tab 180.

As described in more detail in connection with FIG. 8 below, the bottom case 140 may include a stepped structure to accommodate the second region 180b of the pull tab 180 therein.

FIG. 5 illustrates a perspective view depicting a battery pack and a bending direction of a pull tab according to an embodiment.

Referring to FIG. 5, the adhered parts 144 of the bottom case 140 according to an embodiment may be configured to extend a predetermined length along both long side regions 112 of the battery cell 110 in a vertical direction with respect to a bottom surface of the bottom case 140. The adhered parts may be defined as a first adhered part 144a and a second adhered part 144b at opposite sides of the battery cell 110. According to an embodiment, the first adhered part 144a and the second adhered part 144b of the adhered parts 144 may be asymmetrical with each other.

For example, as illustrated in FIG. 5, when a battery pack 10 is to be mounted/dismounted in/from an electronic device, such as a digital camera or an action cam, in a slot direction, the pull tab 180 may be used in mounting/dismounting the battery pack 10. The pull tab 180 may be bent in a predetermined direction.

For example, the pull tab 180 may be bent in a same direction as the direction in which a battery cover of the electronic device is closed, in order to help prevent the third region 180c of the pull tab 180 from being cut due to fatigue, which could occur if the pull tab 180 were bent in a direction opposite to the direction in which the battery cover of the electronic device is closed. In addition, if the pull tab 180 were to be bent in the opposite direction to the direction in which the battery cover of the electronic device is closed, interference between the pull tab 180 and a switch of the battery cover of the electronic device could occur.

Accordingly, the bottom case 140 may be adhered to a battery cell 110 in a predetermined direction. The bottom case 140 may be adhered to the battery cell 110 after the pull tab 180 is adhered to the bottom case 140. If the bottom case 140 were to be adhered opposite to the predetermined direction, the pull tab 180 could be undesirably bent in the opposite direction to the direction in which the battery cover of the electronic device is closed.

As illustrated in FIG. 4, the two adhered parts 144a and 144b of the bottom case 140 may be asymmetrical with each other. Accordingly, the adhered direction of the bottom case 140 may be easily ascertained when the bottom case 140 is adhered to the battery cell 110.

In order to secure asymmetry of the adhered parts 144, the first adhered part 144a may include a zig groove 181. For example, the zig groove 181 may have a semicircular shape in which the first adhered part 144a is pierced from an end of the first adhered part 144a toward a bottom portion 143 of the bottom case 140.

Figure 6:
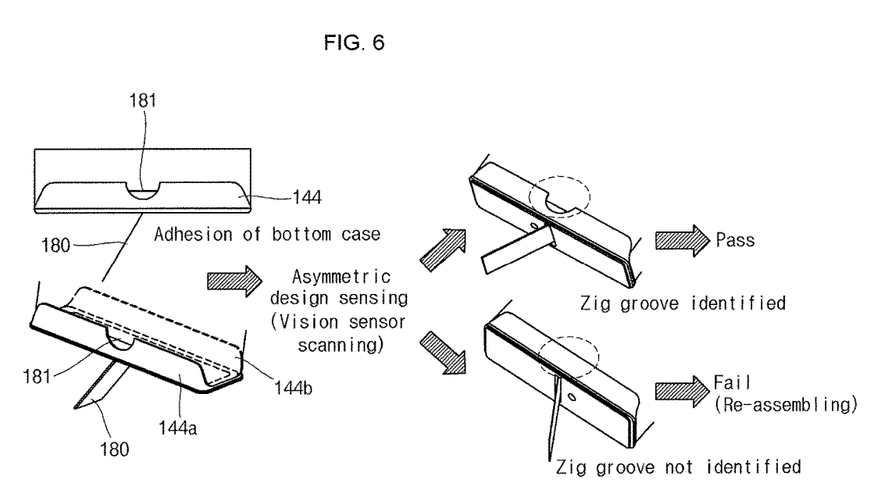
FIG. 6 illustrates discrimination of erroneous assembling of a bottom case as identified based on an adhered direction.

FIG. 6 illustrates how erroneous assembling of a bottom case may be identified depending on the adhered direction.

As described above, when opposite sides of the adhered parts 144 of the bottom case 140 are asymmetrical with each other, the adhered direction of the bottom case 140 may be easily ascertained when the bottom case 140 is adhered to the battery cell 110 and erroneous assembling of the bottom case 140 can be easily determined through metal sensing or visual sensing using a vision sensor in an assembling process or an inspection process.

FIG. 6 illustrates a case where the first adhered part 144a including the zig groove 181 of the bottom case 140 formed therein should be adhered at a frontward location so as to make the pull tab 180 bend in a left direction. If the zig groove 181 is identified by sensing the asymmetric design, for example, using the vision sensor, it can be determined that the bottom case 140 is adhered in a normal direction. However, if the zig groove 181 is not identified, it can be determined that the bottom case 140 is adhered in an abnormal direction, for example, in the opposite direction of where it should be, and a re-assembling work may be requested.

Figure 7:
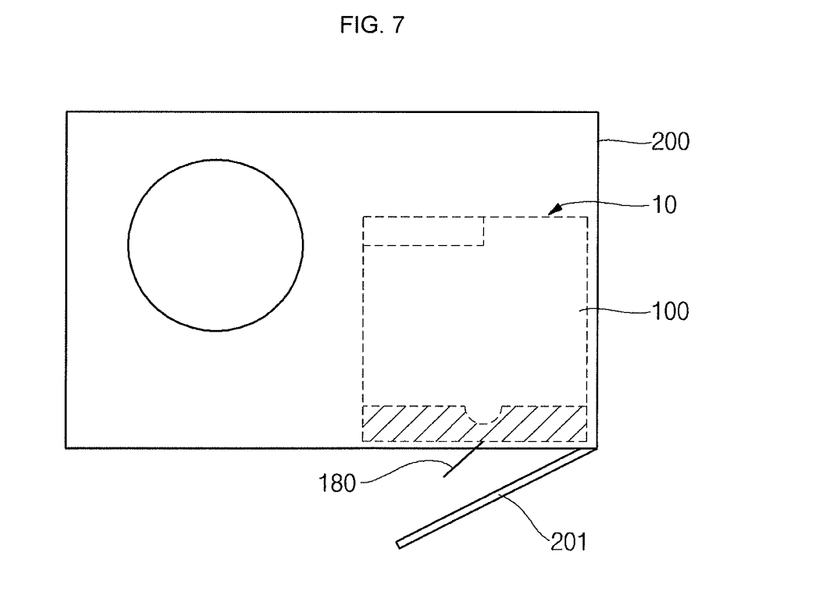
FIG. 7 illustrates an example of an electronic device employing a battery pack of a secondary battery.

FIG. 7 illustrates an example of an electronic device employing a battery pack of a secondary battery. Referring to FIG. 7, in the secondary battery 100, a pull tab 180 of a bottom case 140 may be adhered in a predetermined direction by designing adhered parts 144 of the bottom case 140 so as to secure asymmetry or by forming a zig groove in one of the adhered parts, e.g., in a first adhered part 144a.

Accordingly, when a battery pack 10 including the secondary battery 100 is inserted into an electronic device 200 and a battery cover 201 is closed, the pull tab 180 of the battery pack 10 may be bent in the same direction with a direction in which the battery cover 201 is closed, thereby helping to prevent the pull tab 180 from being cut or broken or helping to prevent interference between the pull tab 180 and a switch of the battery cover 201.

Figure 8:
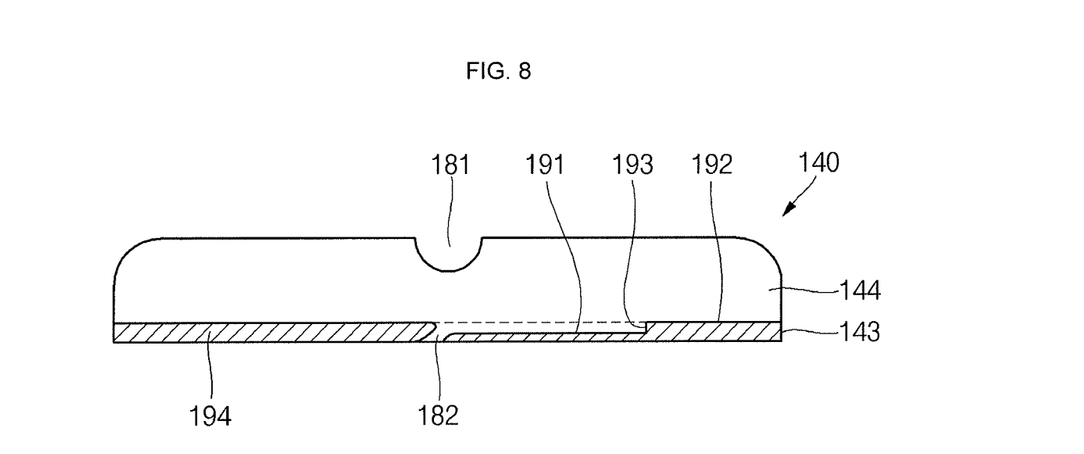
FIG. 8 illustrates a cross section of a bottom case according to another embodiment.
Figure 9:
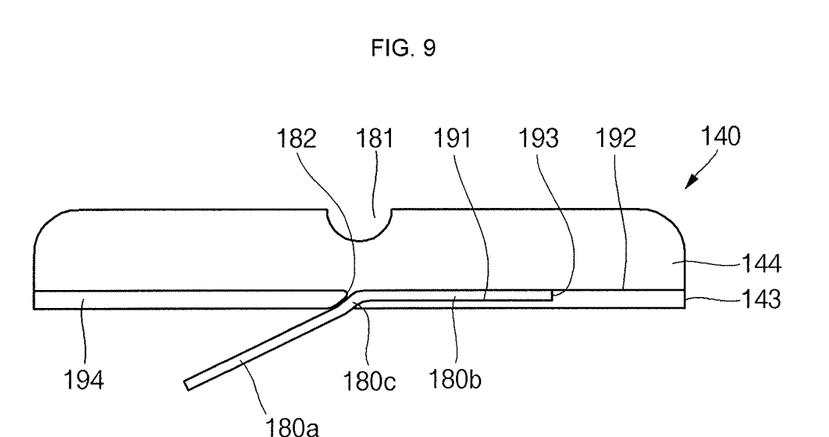
FIG. 9 illustrates a cross section in which a pull tab is adhered to the bottom case illustrated in FIG. 8.

FIG. 8 illustrates a cross section of a bottom case according to another embodiment and FIG. 9 illustrates a cross section in which a pull tab is adhered to the bottom case illustrated in FIG. 8.

Referring to FIG. 8, the bottom case 140 may include a penetration groove 182 formed near the center of bottom portion 143 of the bottom case 140. A stepped part 193 of a predetermined depth may be formed at one side of an upper surface of the bottom portion 143 of the bottom case 140 based on the penetration groove 182 to provide one region 191 that is lower than another region 192 of the bottom portion 143 of the bottom case 140. Herein, the term "upper surface" of the bottom portion 143 of the bottom case 140 refers to a surface that faces the bottom surface 111 of the battery cell 110.

Another region 194 opposite to the one side of the upper surface of the bottom portion 143 of the bottom case 140 may the same height as the other region 192 without a stepped part 193. The stepped part 193 may be formed to correspond to a thickness of the pull tab 180.

The penetration groove 182 may be an opening pierced in the bottom surface of the bottom case 140 in a vertical direction or an opening pierced with an inclination according to the direction in which the pull tab 180 is installed. In the latter case, the bending degree may be reduced at a third region 180c of the pull tab 180, thereby lessening the fatigue around the third region 180c of the pull tab 180.

Referring to FIG. 9, a second region 180b of the pull tab 180 may be adhered to a top portion of the one region 191 of the one side of an interior bottom surface of the bottom case 140 that has lower upper surface than the other regions 192 and 194. The third region 180c of the pull tab 180 may be positioned in the penetration groove 182. A first region 180a of the pull tab 180 may protrude to the outside of the bottom case 140 to then be bent in a direction opposite to the second region 180b. A thickness of the second region 180b of the pull tab 180 may be equal to the depth of the stepped part formed at one side of the bottom portion 143 of the bottom case 140. When the second region 180b of the pull tab 180 is adhered to the upper surface of the bottom portion 143 of the bottom case 140, the upper surface of the bottom portion of the bottom case 140 may have a constant height or thickness on the whole.

By way of summation and review, embodiments provide a pack case structure of a secondary battery that facilitates mounting/dismounting of a battery pack into an electronic device.

Embodiments also provide a secondary battery constructed to help prevent a bottom case from being reversely assembled when a battery pack is manufactured In the secondary battery, even when only a partial section of the secondary battery is exposed to the outside, the battery can be easily mounted/dismounted in/from a small electronic device when it is to be withdrawn after a battery pack is inserted into the small electronic device in a slot direction. In addition, in the secondary battery, it is possible to prevent a bottom case from being reversely assembled when a pull tab should be oriented in a predetermined direction within the electronic device or when the bottom case should be assembled with directionality. For example, reverse assembling of the bottom case can be ascertained in an assembling process and an inspection process, respectively, by performing a vision test using a zig groove formed in the bottom case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
a battery cell;
a protection circuit module electrically connected to the battery cell;
a top case covering the protection circuit module;
a bottom case covering a bottom surface of the battery cell, the bottom case including a penetration groove located at a center of a bottom surface of the bottom case, and
a pull tab that includes a first region of the pull tab that protrudes to an outside of the bottom case, a second region of the pull tab inside the bottom case, the second region of the pull tab being between a first region of an upper surface of a bottom portion of the bottom case and the bottom surface of the battery cell, and a third region of the pull tab that passes through the penetration groove, the third region of the pull tab being between the first region of the pull tab and the second region of the pull tab.

2. The secondary battery as claimed in claim 1, wherein at least one of the first region of the pull tab and the third region of the pull tab has flexibility.

3. The secondary battery as claimed in claim 1, wherein the upper surface of the bottom portion of the bottom case has a stepped part such that the first region of the bottom portion of the bottom case has an upper surface that is lower than an upper surface of a second region of the bottom surface of the bottom case, the penetration groove being between the first region of the bottom surface of the bottom case and the second region of the bottom surface of the bottom case.

4. The secondary battery as claimed in claim 3, wherein:
the stepped part has a depth corresponding to a thickness of the pull tab, and
the second region of the pull tab is adhered to the upper surface of the first region of the bottom portion of the bottom case.

5. The secondary battery as claimed in claim 1, wherein the bottom case further includes a pair of adhered parts extending from opposite long side regions in a vertical direction with respect to the bottom surface of the bottom case, the pair of adhered parts being asymmetrical with each other.

6. The secondary battery as claimed in claim 5, wherein a zig groove is located in one adhered part of the pair of adhered parts.

7. The secondary battery as claimed in claim 6, wherein the zig groove located in the one adhered part is a semicircular groove that extends from a first end of the adhered part toward the bottom surface of the bottom case.

* * * * *